Patented Aug. 28, 1951

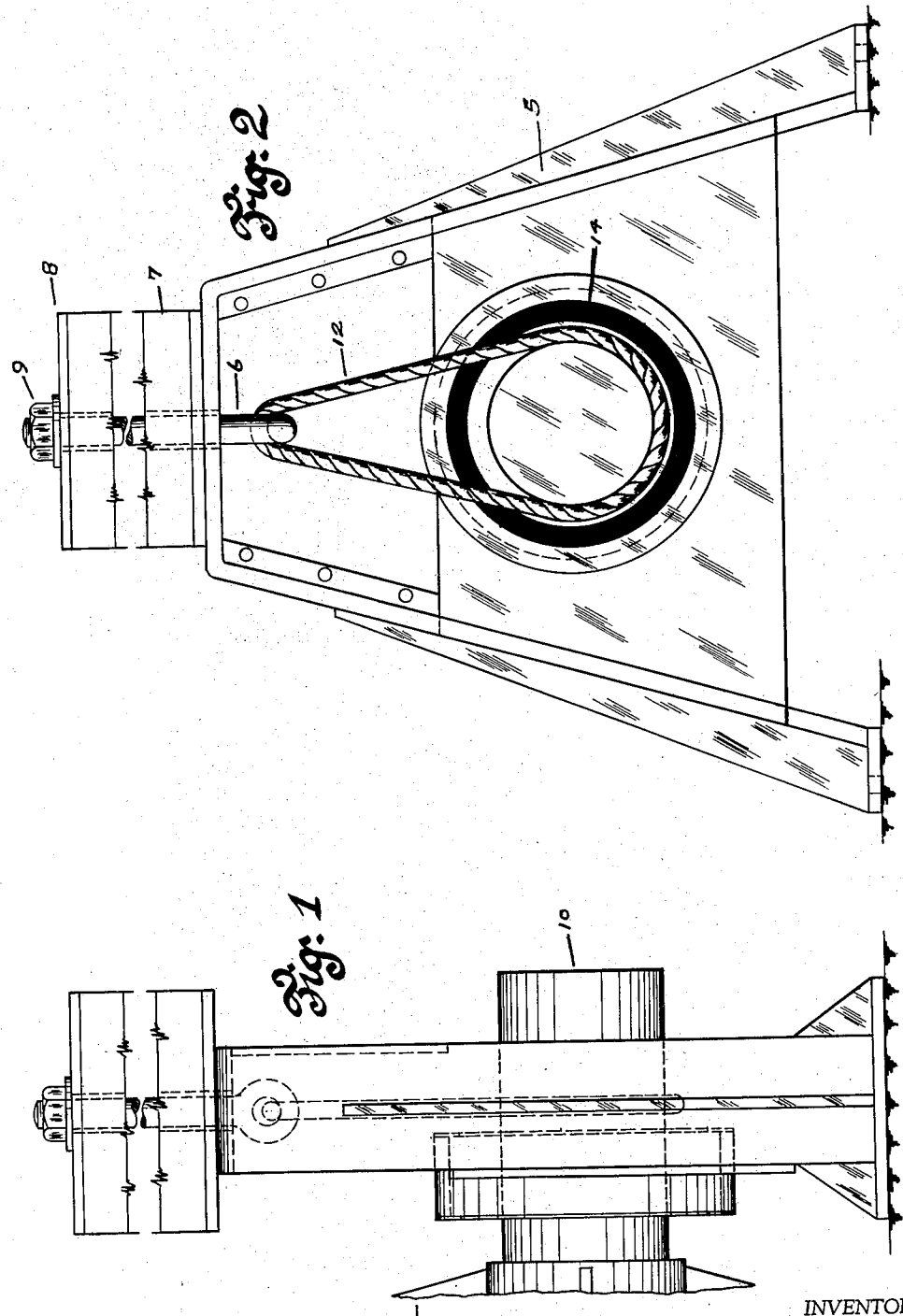

2,565,785

UNITED STATES PATENT OFFICE 2,565,785

VIBRATORY EQUIPMENT

Lewis E. Soldan, Chicago, Ill.

Application January 6, 1945, Serial No. 571,683

5 Claims. (Cl. 248—358)

This invention relates to improvements in vibratory equipment. More particularly, the invention relates to improvements in mounting devices for vibratory equipment.

It is an object of the present invention to provide an improved mounting device for vibratory equipment.

Vibratory equipment is usually provided with a material-carrying platform or bed that is vibrated by a suitable mechanism. The platform or bed preferably is supported in such a manner that it can vibrate between resiliently maintained limits. Such a support is highly desirable because it permits relatively free movement of the vibrating equipment at small amplitudes of vibration, and provides a progressive increase in limitation of freedom of movement at large amplitudes of vibration. This progressive increase in limitation of freedom of movement at larger amplitudes of vibration is due to the fact that the resistance to movement progressively increases with the amount of movement. As a result of the use of this type of support, it is possible to provide relatively free movement of the vibrating equipment at small amplitudes without permitting undue vibration of that equipment to escape into the base foundation or floor. The relatively free movement at small amplitudes is necessary to permit the vibratory equipment to do the work for which it is intended, and the prevention of undue vibration is necessary to prevent injury to the equipment and to the material being vibrated or to the support and other equipment. It is therefore an object of the present invention to provide a mounting device for vibratory equipment that permits vibration of the vibratory equipment between resiliently maintained limits.

Vibration out of control has wrecked many machines—but vibration definitely controlled can do useful work. In order to be effective the vibration should be positive and sharp—therefore about 1200 R. P. M. of the eccentrics and should be self-contained with a minimum of escaping vibration. Therefore we use a supporting member to which is attached a resilient block of rubber, cork, plastic, felt or combinations of same or other resilient material which in turn is fastened to the vibrating body. This permits free movement of the vibrating body within limits and at the same time absorbs or arrests the movement to prevent its escape into the foundation or floor, thereby making the unit self-contained. The resilient member may be of any suitable material and form and may be connected to the supporting member various ways well understood by anyone familiar with the art: for instance the resilient member may be supported by the supporting member or the supporting member itself may be mounted on the resilient member. Also the resilient member may be of any shape or form permissible or practical: for instance cylindrical blocks, square or oblong, flat, round, etc.; hollow, semi-solid or solid. The resilient material may also be so placed as to be in compression-extension or shear.

A satisfactory mounting device for vibratory equipment must be resilient enough to prevent swinging or swaying of the vibratory equipment. This swaying can be quite objectionable since it may interfere with the proper vibration of the equipment. The present invention obviates this objection by providing a resilient mounting that will give the desired resilience and will also give the desired resistance to side thrust. It is therefore an object of the invention to provide an improved resilient mounting device for vibratory equipment.

Other objects and advantages of the invention will become apparent to those skilled in the art from an examination of the drawing and accompanying description.

In the drawing and accompanying description a preferred form of the invention is shown and described, but it is to be understood that the drawing and accompanying description do not limit the invention and the invention will be defined by the appended claims.

In the drawing

Fig. 1 is a side elevational view of one preferred form of mounting device,

Fig. 2 is a cross-sectional view of the mounting device shown in Fig. 1 and is taken along the plane 2—2.

Referring to the drawings in detail, a yoke that may be secured to the platform or bed of vibratory equipment is denoted by the numeral 5. This yoke preferably has an opening at the top through which extends an eye-bolt 6. Above the yoke is a block 7 of rubber resilient material through which the eye-bolt also extends. A rigid plate 8 above the rubber serves as a support for the nut 9. A projection 10 extends from the vibration apparatus 11 and is supported by member 12. This member 12 may be of any suitable material. At present I prefer a cable which extends through the eye of the eye-bolt and around the projection 10. A cushion of rubber 14 is used to limit movement of the mechanism when starting and stopping. The advantages of this arrangement over that shown in the other application Serial No. 571,682 filed January 6, 1945, now Patent No. 2,484,191, will be readily appreciated by one skilled in the art. The methods of operation of the devices shown in the two applications are similar.

While I have shown an eye-bolt extending through the rubber cushion and the yoke I may use instead a cable member which will extend around and carry the projection, which cable may be supported in a suitable manner above the yoke. While I have shown a yoke as a preferred construction, any other device to carry the vibrating member may be used. The flexible cable shown is merely a preferred construction over a rigid member.

What I claim is:

1. A mounting device for vibrating equipment comprising a stationary support, a vibrating member, a member that is supported by said stationary support and yieldably connects said vibrating member to said stationary support to permit the free movement of said vibrating member, a second member for resiliently limiting the free movement of said vibrating member to a predetermined amount, said member that connects said vibrating member to said stationary support including a block of resilient material, a bolt, and a flexible cable.

2. A mounting device for vibrating equipment comprising a support, a resilient material mounted thereon, a vibrating member, an arm attached thereto, a flexible member that is supported by said resilient material and supports said arm of said vibrating member, resilient material attached to the support and spaced about the arm and at a predetermined distance therefrom to permit limited movement of the arm.

3. A mounting device for vibrating equipment comprising a support, resilient material carried by support, a vibrating member, an arm extending from said member, flexible means, supported by the resilient material, carrying said arm, resilient material carried by the support and spaced with a predetermined clearance between the arm and said material to permit limited movement.

4. In a vibrating device that comprises a vibrating member, means to vibrate said vibrating member, and a support for said vibrating member that permits limited vertical and endwise movement of said vibrating member, the improvement which comprises a plurality of projections extending outwardly from the sides of said vibrating member, a supporting frame in register with each of said projections, a resilient member supported by each of said supporting frames, and a plurality of flexible members that are supported by said resilient members and that support the projections of said vibrating member, said flexible members being deformable to permit relative rolling between themselves and said projections and thus to permit limited endwise movement of said vibrating member, the resilience of said resilient members offering progressively increasing resistance to vertical movement of said vibrating member and the flexibility of said flexible members offering progressively increasing resistance to endwise movement of said vibrating member whereby said vibrating member is permitted to vibrate but is biased to remain in a limited area.

5. A mounting device for vibrating equipment that comprises a stationary support, a vibrating member, a resilient member supported by said stationary support, an opening in said resilient member, a connecting member that extends through and is appreciably smaller than the opening in said resilient member and is supported by said resilient member, and a flexible member that is supported by said connecting member and in turn supports said vibrating member, said flexible member being deformable to permit limited endwise movement of said vibrating member.

LEWIS E. SOLDAN.

REFERENCES CITED

The following references are of record in the file of this patent:

UNITED STATES PATENTS

| Number | Name | Date |
| --- | --- | --- |
| 645,057 | Ayers et al. | Mar. 13, 1900 |
| 1,139,158 | Boerries | May 11, 1915 |
| 1,330,512 | Billinghurst | Feb. 10, 1920 |
| 1,365,290 | Stephens | Jan. 11, 1921 |
| 1,470,493 | Show | Oct. 9, 1923 |
| 1,651,934 | Sayers | Dec. 6, 1927 |
| 1,764,761 | Spreen | June 17, 1930 |
| 1,871,861 | Rossman | Aug. 16, 1932 |
| 2,062,529 | Sahut | Dec. 1, 1936 |
| 2,117,919 | Summers | May 17, 1938 |
| 2,165,542 | Gaither | July 11, 1939 |
| 2,221,884 | Schmidt | Nov. 19, 1940 |
| 2,239,993 | Corwin | Apr. 29, 1941 |
| 2,353,943 | Storch | July 18, 1944 |
| 2,389,562 | Storch | Nov. 20, 1945 |
| 2,397,804 | Nakken et al. | Apr. 2, 1946 |
| 2,442,355 | Greenslade | June 1, 1948 |